United States Patent [19]

Voelker et al.

[11] Patent Number: 4,504,448

[45] Date of Patent: Mar. 12, 1985

[54] ACTIVATED CARBON ADSORPTION OF FLOTATION REAGENTS FROM TUNGSTEN SOLUTIONS

[75] Inventors: Dennis E. Voelker, Ft. Madison, Iowa; Leo W. Beckstead; Robert F. Hogsett, both of Arvada, Colo.

[73] Assignee: Amax Inc., Greenwich, Conn.

[21] Appl. No.: 583,904

[22] Filed: Feb. 27, 1984

[51] Int. Cl.³ .............................................. C01G 41/00
[52] U.S. Cl. ....................................... 423/54; 423/53; 423/61; 75/101 BE
[58] Field of Search ................ 423/54, 61; 75/101 BE

[56] References Cited

U.S. PATENT DOCUMENTS 4,342,728  8/1982  Queneau et al. ...................... 423/61
4,379,126  4/1983  Kim et al. ...................... 75/101 BE Primary Examiner—Herbert T. Carter
Attorney, Agent, or Firm—Michael A. Ciomek; Eugene J. Kalil

[57] ABSTRACT

Foaming in the hydrometallurgical treatment of a tungsten-containing aqueous solution due to the presence of carbonaceous organic material impurities, such as flotation reagents, is substantially inhibited by the addition of effective amounts of powdered activated carbon, the carbon with the adsorbed impurities being thereafter separated from the solution by filtering. The activated carbon also protects the solvent extraction circuit from contamination. The method is particularly applicable to slurries of tungsten oxide concentrates during the high temperature, high pressure leaching thereof with sodium carbonate solutions in an autoclave.

4 Claims, No Drawings

ACTIVATED CARBON ADSORPTION OF FLOTATION REAGENTS FROM TUNGSTEN SOLUTIONS

This invention relates to the treatment of tungsten oxide ores, such as scheelite concentrates, and to a process for treating tungsten oxide flotation concentrates containing amounts of flotation reagents (carbonaceous organic matter) which interfere with the hydrometallurgical treatment of such concentrates or tungsten-containing aqueous solutions.

BACKGROUND OF THE INVENTION

It is known to leach with sodium carbonate solutions tungsten oxide ($WO_3$) concentrates containing up to about 70% by weight of $WO_3$, e.g., about 2% to 70% or 5% to 70% $WO_3$. Low grade scheelite concentrates containing about 2% to 40% $WO_3$ have been similarly leached.

A process illustrating the aforementioned type of leaching is disclosed in U.S. Pat. No. 4,351,808, the disclosure of which is incorporated herein by reference. According to this patent, scheelite concentrate is leached by forming it into a slurry in an aqueous sodium carbonate solution of initial concentration ranging from about 50 gpl to 200 gpl (grams per liter) at a $Na_2CO_3$/$WO_3$ weight ratio of about 0.9 to 1.6 and then digesting the slurry in an autoclave at an elevated temperature ranging from about 180° C. to 310° C., e.g., about 200° C. to 250° C., preferably from about 200° C. to 235° C.

Optimum results are achieved by employing the $Na_2CO_3$ concentration of the leach solution in substantially inverse relationship with the digestion temperature and in substantially direct relationship with the $Na_2CO_3$/$WO_3$ weight ratio, the relationship selected being such as to effect the consistent dissolution of at least about 95% of the $WO_3$ in the concentrate, preferably at least about 97%, and provide a pregnant liquor containing the $WO_3$. By employing the foregoing relationship, the alkalinity can be controlled to levels favorable to the substantial inhibition of gangue minerals, such as gangue containing one or more of CaO, $SiO_2$, calcium fluoride, etc. The presence of magnesium in the form of a magnesium-containing compound is very helpful in inhibiting substantially the dissolution of silica. The magnesium compound may be naturally present or deliberately added as dolomite. The amount of magnesium present may range from about 2% to 10% by weight of the concentrate, and preferably from about 4% to 6% by weight.

In a preferred embodiment, the initial soda ash concentration ranges from about 75 gpl to 175 gpl and more preferably from about 75 gpl to 150 gpl. Likewise, the $Na_2CO_3$/$WO_3$ weight ratio may range from about 1 to 1.4.

The higher the digestion temperatures, the less is the amount of soda ash needed to achieve high tungsten extraction and the greater is the $WO_3$/$Na_2CO_3$ ratio in the pregnant solution. Also, the higher the initial concentration of $Na_2CO_3$, the higher the weight ratio of $Na_2CO_3$/$WO_3$ needed to obtain $WO_3$ extraction in excess of 95%, e.g., at least about 97% or 98%. By controlling the $Na_2CO_3$/$WO_3$ weight ratio, pregnant liquors containing up to about 130 or 140 gpl of $WO_3$ are obtainable.

Generally speaking, the flotation concentrate contains residual amounts of flotation reagents which tend to interfere with subsequent hydrometallurgical processing. For example, the presence of flotation reagents can cause substantial foaming during hydrometallurgical processing. Foaming can lower the capacity of the processing vessels, or can cause hazardous conditions by overflowing such vessels. If the flotation reagents are carried on to subsequent process steps, such as solvent extraction, the flotation reagents can contaminate the organic phase causing substantial processing inefficiencies and often requiring periodic replacement of the organic extractant. In the processing of tungsten concentrates which contain significant amounts of molybdenum the presence of flotation reagents or other organic matter can reduce the effectiveness of the molybdenum removal operation.

Roasting the concentrate prior to treatment in the autoclave removes the carbonaceous organic matter. However, this method is expensive and, moreover, may generate arsenic fumes, if arsenic is present, or produce organic-fouled scheelite dust.

In U.S. Pat. No. 4,342,728, a process is proposed for removing the flotation reagents during digestion by carrying out the digestion in an alkaline solution under oxidizing conditions, the process comprising establishing a slurry of a sodium carbonate solution having sodium carbonate concentration between about 50 gpl and about 200 gpl and a scheelite concentrate in an amount to provide a $Na_2CO_3$/$WO_3$ weight ratio of between about 0.9 to about 1.6, and heating the slurry to a temperature between about 230° C. and about 320° C. under an oxygen partial pressure of at least about 25 psi to digest the scheelite concentrate forming a pregnant sodium tungstate solution and to oxidize the organic matter.

We have found that we can avoid foaming either during or after the autoclave leaching, and protect the solvent extraction for contamination, by adding activated carbon to the tungsten-containing aqueous solution selective to the adsorption of flotation reagents, be it a slurry in the autoclave, or a tungsten solution following high pressure leaching, so long as the amount of carbon added (and the type) is sufficient to adsorb the flotation reagent or other carbonaceous organic material.

OBJECTS OF THE INVENTION

It is thus an object of the invention to provide a process for inhibiting foaming in the hydrometallurgical treatment of tungsten oxide concentrates.

Another object is to provide a process for adsorbing and removing carbonaceous organic matter, such as flotation reagents, in the hydrometallurgical treatment of tungsten oxide concentrates or solutions thereof.

These and other objects will more clearly appear when taken in conjunction with the following disclosure and the appended claims.

SUMMARY OF THE INVENTION

Generally speaking, the present invention relates to a process for conditioning a tungsten ore or concentrate containing carbonaceous organic material, e.g., flotation reagents.

In one embodiment, a slurry of tungsten oxide is mixed with water and alkaline compound, e.g., sodium hydroxide or sodium carbonate, in an autoclave to which activated carbon is also added and the mixture digested at a temperature of about 180° C. to 310° C. (e.g., about 200° C. to 250° C.) at elevated pressure for a time sufficient to dissolve substantially all of the tungsten in the tungsten oxide material and provide a pregnant solution which is thereafter filtered.

In another embodiment, the activated carbon may be added to the pregnant solution following leaching in the autoclave and the solution thereafter filtered prior to the next processing step to remove the activated carbon with the adsorbed carbonaceous organic material.

Thus, in the broad aspect, the addition of activated carbon to a tungsten-containing aqueous solution is meant to include the addition thereof to a slurry to be digested in an autoclave or to a tungsten solution following treatment of the slurry in the autoclave.

DETAILS OF THE INVENTION

In carrying out one embodiment of the invention into practice, a slurry of a scheelite concentrate is formed in an aqueous sodium carbonate solution of an initial concentration ranging from about 50 gpl (grams per liter) to 200 gpl at a $Na_2CO_3/WO_3$ weight ratio ranging from about 0.9 to 1.6. To the slurry is added powdered activated carbon (referred to by the trade name DARCO T-88), e.g. 1 lb. carbon to 32 lbs. $WO_3$, and the mixture leached at elevated pressure and at a temperature ranging from about 180° C. to 310° C. The pressure employed corresponds at least to the saturation pressure at the temperature employed. Preferably the initial concentration is such that the $Na_2CO_3$ employed is substantially inversely correlated to the digestion temperature and substantially directly correlated to the $Na_2CO_3/WO_3$ weight ratio, whereby at least about 95% by weight of $WO_3$ of the tungsten material being leached is dissolved. The addition of the activated carbon inhibits foaming of the leach liquor.

The amount of activated carbon added may range from about ¼% carbon to 5% carbon by weight of $WO_3$ present, and preferably about ½% carbon to 3% carbon by weight of $WO_3$ present.

The preferred powdered activated carbon is that derived from coconut shells and bituminous coal and has a surface area of at least about 1000 $M^2/gr$ and an iodine number greater than 900. Other types of powdered activated carbon can be used so long as it is selective to the adsorption of flotation reagents and carbonaceous organics present in the solution and has an area of at least about 1000 $M^2/gr$ and an iodine number of over 900.

The pulp density of the aqueous feed to the autoclave may range from about 10% to 50% solids by weight, the higher pulp density being preferred with low grade concentrates.

A preferred autoclave mix is one containing about 75 to 175 gpl $Na_2CO_3$, a weight ratio of $Na_2CO_3/WO_3$ ranging from about 1 to 1.4, a temperature of about 200° C. to 250° C., and an elevated pressure of about 225 psig to 575 psig. The pregnant liquor resulting from the autoclave leaching may range upwards to 100 gpl $WO_3$ and generally between about 75 to 95 gpl. This liquor, if it contains flotation oil or other carbonaceous organic material can be similarly treated with activated carbon if it tends to foam during subsequent processing, especially if carbon has not been added to the slurry in the autoclave.

As illustrative of the invention, the following example is given:

EXAMPLE

Wet Cantung flotation concentrate containing 38.7% $WO_3$ was treated. The concentrate contained between about 0.1% to 1% of saponified tall oil.

A slurry was established in the autoclave in which the weight of $Na_2CO_3/WO_3$ was 1.2 lbs. $Na_2CO_3$ to 1 lb. $WO_3$, the initial concentration of $Na_2CO_3$ being 120 gpl. This results in a final $WO_3$ concentration of about 100 gpl. The leaching was carried out in the autoclave for about 2 hours at 230° C.

Various foam tests were run as follows: (1) one without inhibiting foam (referred to as the standard), (2) one using $H_2O_2$ as an oxidizer, (3) another using oxygen overpressure as an oxidizer as in U.S. Pat. No. 4,342,728, and (4) two tests using activated carbon as an adsorption agent (carbon material known by the trade name DARCO T-88).

In determining the amount of foam resulting from each test, a filtrate from each of the runs in an amount of 50 ml was poured into a 500 ml graduate cylinder. An air sparger was then inserted into the bottom of the graduate and the height of the foam generated in two minutes was measured for a standard air flow of 0.2 liters per minute. The foaming tests were conducted at ambient temperature.

The tests employed and the results are given in the table below:

| Test No. | Description of Test | $WO_3$ Extraction, % | Filtrate Foam, cc |
|---|---|---|---|
| 1 | Standard digestion | 99.6 | 20 |
| 2 | 1 lb 30% $H_2O_2$/lb $WO_3$ added to autoclave | 98.4 | 90 |
| 3 | 100 psi $O_2$ overpressure plus leach | 99.0 | 50 |
| 4 | 1 lb carbon/32 lb $WO_3$ added to autoclave | 99.8 | <5 |
| 5 | 1 lb carbon/64 lb $WO_3$ added to autoclave | 99.0 | <5 |

The amount of carbon employed in Test No. 4 was 1 lb. carbon/32 lbs. of $WO_3$ and in Test No. 5, 1 lb. of carbon/64 lbs. of $WO_3$, the amount in percent being approximately 3.125% and 1.5%, respectively.

As will be noted, Test Nos. 4 and 5 gave consistently high recoveries of $WO_3$ and a foam height in the graduate of less than 5 cc. The activated carbon was superior to the use of oxygen overpressure and to the use of $H_2O_2$.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In a hydrometallurgical process for the extraction of tungsten from tungsten flotation concentrates, wherein a concentrate containing by weight about 2% to 70% $WO_3$ is leached at elevated temperature and pressure with an alkaline solution to provide a pregnant aqueous solution of said contained tungsten, said flotation concentrate containing carbonaceous organic material derived from flotation reagents used to produce said concentrate, with carbonaceous organic material causes foaming during hydrometallurgical treatment and which also contaminates and adversely affects the subsequent solvent extraction of said tungsten from said solution, the improvement which comprises:

adding an effective amount of activated carbon to said tungsten-containing solution sufficient to adsorb and remove said carbonaceous organic material therefrom, said activated carbon having a surface area of at least about 1000 $M^2$ per gram and an iodine number of over 900, and then separating said activated carbon from said tungsten-containing pregnant solution, thereby providing a tungsten-containing solution cleansed of carbonaceous organic material such that the foaming thereof is substantially inhibited and such that contamination of organic solvent in a subsequent solvent extraction step is substantially avoided.

2. The process of claim 1, wherein the leaching is carried out in an autoclave, wherein the amount of activated carbon added to the tungsten-containing solution corresponds to about ¼% to 5% by weight of the contained $WO_3$.

3. The process of claim 2, wherein the alkaline solution initially contains about 50 gpl to 200 gpl $Na_2CO_3$, wherein the weight ratio of $Na_2CO_3/WO_3$ ranges from about 0.9 to 1.6, and wherein the temperature in the autoclave ranges from about 180° C. to 310° C.

4. The process of claim 3, wherein the amount of carbon added ranges from about ½% to 3% by weight of $WO_3$, wherein the temperature ranges from about 200° C. to 250° C., and wherein the pressure ranges from about 225 psig to 575 psig.

* * * * *